United States Patent
Kapadia et al.

(10) Patent No.: US 12,203,832 B2
(45) Date of Patent: Jan. 21, 2025

(54) MICROFLUIDIC VISCOMETER FOR MEASURING THE VISCOSITY OF MICROLITER-VOLUME LIQUID SAMPLES

(71) Applicants: Wasim Kapadia, British Columbia (CA); Ning Qin, Shandong (CN); Pei Zhao, Shandong (CN); Chau-minh Phan, Waterloo (CA); Lacey A. Haines, Waterloo (CA); Lyndon William James Jones, Waterloo (CA); Carolyn Liqing Ren, Waterloo (CA)

(72) Inventors: Wasim Kapadia, British Columbia (CA); Ning Qin, Shandong (CN); Pei Zhao, Shandong (CN); Chau-minh Phan, Waterloo (CA); Lacey A. Haines, Waterloo (CA); Lyndon William James Jones, Waterloo (CA); Carolyn Liqing Ren, Waterloo (CA)

( * ) Notice: Subject to any disclaimer, the term of this patent is extended or adjusted under 35 U.S.C. 154(b) by 0 days.

(21) Appl. No.: 18/289,070

(22) PCT Filed: Apr. 6, 2023

(86) PCT No.: PCT/CA2023/050472
§ 371 (c)(1),
(2) Date: Oct. 31, 2023

(87) PCT Pub. No.: WO2023/193108
PCT Pub. Date: Oct. 12, 2023

(65) Prior Publication Data
US 2024/0219280 A1    Jul. 4, 2024

(30) Foreign Application Priority Data
Apr. 7, 2022   (CA) ..................... 3154534

(51) Int. Cl.
*G01N 11/04*    (2006.01)

(52) U.S. Cl.
CPC ................................. *G01N 11/04* (2013.01)

(58) Field of Classification Search
CPC ........ G01N 11/04; G01N 11/08; G01N 11/06; G01N 2011/008; B01L 3/50273;
(Continued)

(56) References Cited

U.S. PATENT DOCUMENTS

| 4,539,387 A | 9/1985 | Barnaby |
| 4,539,837 A | 9/1985 | Barnaby |

(Continued)

FOREIGN PATENT DOCUMENTS

| CA | 1319840 | 7/1993 |
| CN | 102854094 A * | 1/2013 |

(Continued)

OTHER PUBLICATIONS

Han, Z.; Tang, X.; Zheng, B. A PDMS viscometer for microliter Newtonian fluid. J. Micromechanics Microengineering 2007, 17, 1828-1834, doi: 10.1088/0960-1317/17/9/011 (Year: 2007).*

(Continued)

*Primary Examiner* — Kristina M Deherrera
*Assistant Examiner* — Fatemeh Esfandiari Nia
(74) *Attorney, Agent, or Firm* — Barnes & Thornburg LLP

(57) ABSTRACT

A microfluidic viscometer measures the viscosity of a microliter-volume fluid sample using a microfluidic chip having a microchannel with a high aspect ratio (~10), allowing the microflow therein to be approximated as a rectangular slit flow. The microfluidic chip is fabricated by stacking rigid sheet materials that can be laser cut to specified shapes and sizes. The microchannel, rendered smooth and hydrophobic by a repellant coating, provides a straight flow path for the sample to approach flow equilibrium as it moves through. By applying corrections related to the visual bias from the (Continued)

camera and the capillary pressure difference at the air-liquid interface, the viscosity of the fluid sample can be calculated based on differential pressure data, sample length, velocity, volumetric flow rate, and contact angle from captured video, and the channel dimension, given that the sample has reached a flow equilibrium condition.

25 Claims, 8 Drawing Sheets

(58) Field of Classification Search
CPC ............ B01L 3/5027; B01L 3/502769; B01L 3/502792; B01L 2400/00; B01L 2400/0406; B01L 2400/088
See application file for complete search history.

(56) References Cited

U.S. PATENT DOCUMENTS

| | | | |
|---|---|---|---|
| 5,905,196 A | 5/1999 | Parshall | |
| 6,123,798 A * | 9/2000 | Gandhi | B29C 66/30223 156/308.2 |
| 6,681,616 B2 | 1/2004 | Spaid et al. | |
| 6,898,963 B2 | 5/2005 | Irani | |
| 7,040,144 B2 | 5/2006 | Spaid et al. | |
| 7,770,436 B2 | 8/2010 | Baek | |
| 8,936,945 B2 * | 1/2015 | Handique | B01F 33/30 436/180 |
| 9,733,174 B2 | 8/2017 | Morhell et al. | |
| 11,287,358 B1 * | 3/2022 | Nath | G01N 1/14 |
| 11,839,873 B2 * | 12/2023 | Cromwell | B01L 3/502738 |
| 2003/0041652 A1 * | 3/2003 | Spaid | B01L 3/5027 73/54.05 |
| 2013/0125627 A1 * | 5/2013 | Yuan | G01N 11/08 73/54.01 |
| 2017/0058243 A1 * | 3/2017 | Levner | C12M 21/08 |
| 2022/0404334 A1 * | 12/2022 | Gurkan | G01N 33/5044 |

FOREIGN PATENT DOCUMENTS

| | | | | |
|---|---|---|---|---|
| CN | 107737616 A | * | 2/2018 | ........ B01L 3/502707 |
| CN | 108663289 | | 10/2018 | |

OTHER PUBLICATIONS

Son, Determination of Shear Viscosity and Shear Rate from Pressure Drop and Flow Rate Relationship in a Rectangular Channel, Polymer, 2007, vol. 48, pp. 632-637 (Year: 2007).*
CN-107737616-A (Year: 2013).*
CN-102854094-A (Year: 2014).*
Gao et al., "μPump: An open-source pressure pump for precision fluid handling in microfluidics," HardwareX 7 (2020) e00096.
Islam et al. "A coaxial cylinder type rotational viscometer-design and optimization," Int. J. Sci. & Engineering Res 7: 1792-6 (2016).
Marshall RJ., Milk/Analysis, In: Encyclopedia of Food Sciences and Nutrition. Second Ed.; 2003: 3963-275 3968, doi:10.1016/b0-12-227055-x/01121-4.
Shang et al., "Emerging droplet microfluidics," Chemical reviews 117.12: 7964-8040 (2017).
Xu et al. "Passive micropumping in microfluidics for point-of-care testing," Biomicrofluidics 14.3 (2020).
International Search Report and Written Opinion issued on Jun. 23, 2023 in PCT/CA2023/050472.

* cited by examiner

FIGURE 7
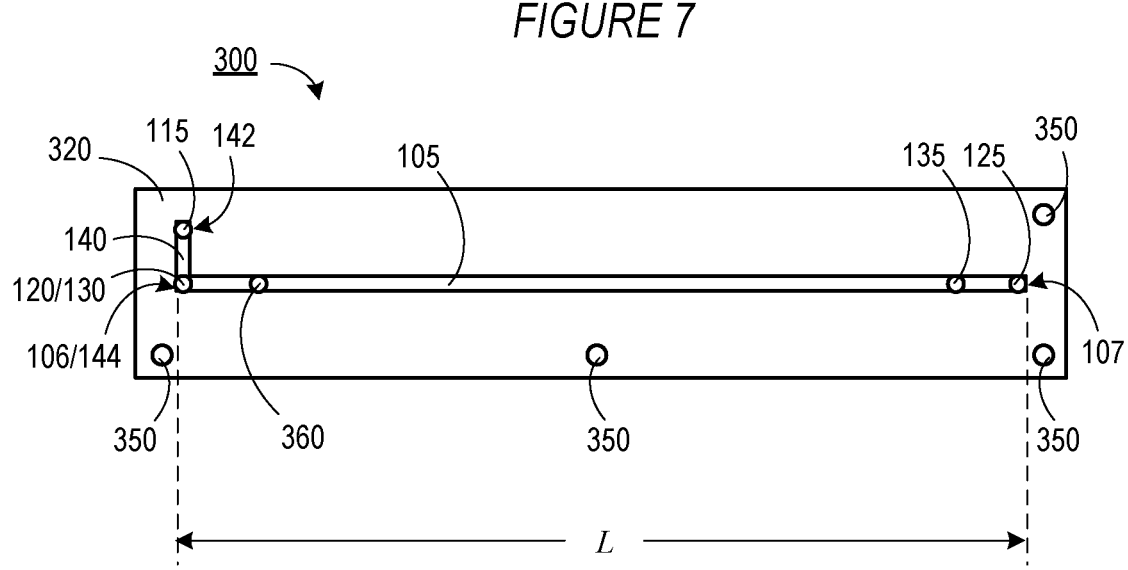
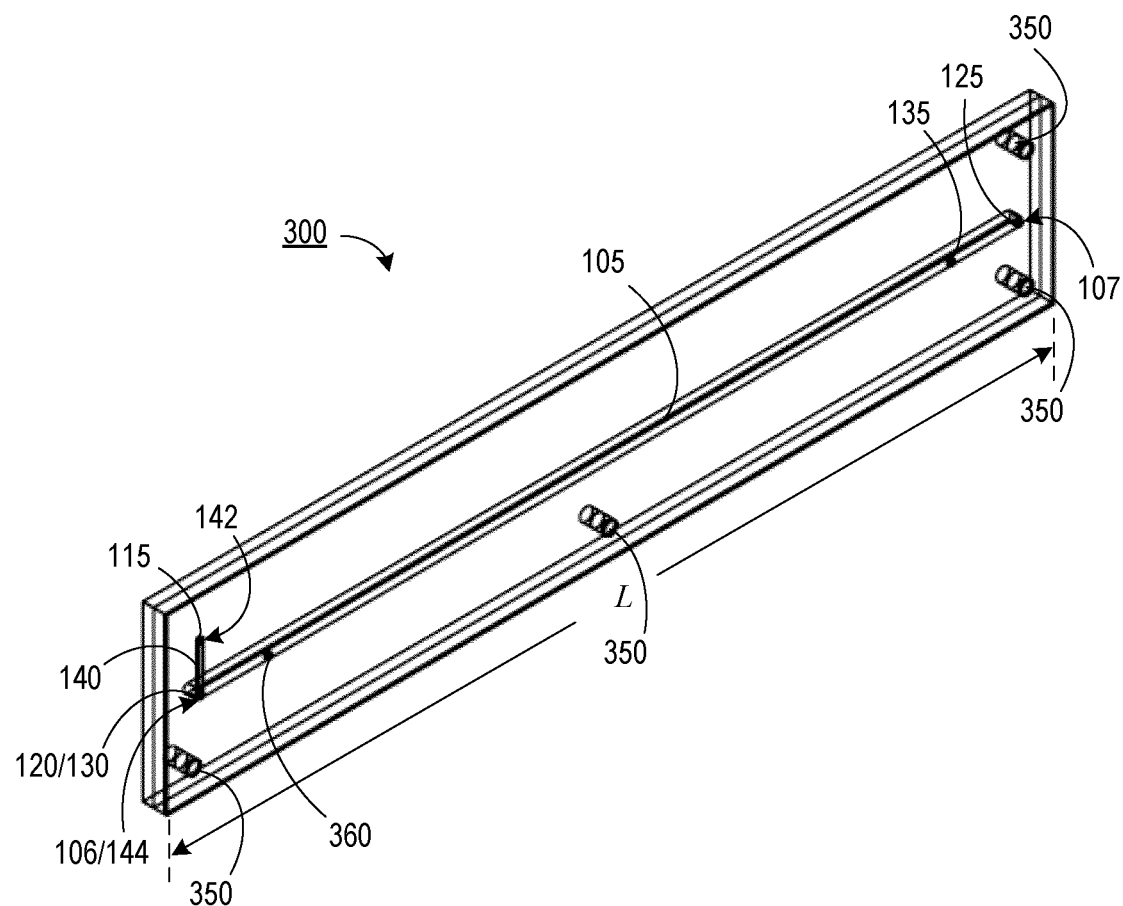
FIGURE 8

MICROFLUIDIC VISCOMETER FOR MEASURING THE VISCOSITY OF MICROLITER-VOLUME LIQUID SAMPLES

CROSS-REFERENCE TO RELATED APPLICATIONS

This application is a US national stage application under Section 371 of PCT Application No. PCT/CA2023/050472, filed on Apr. 6, 2023, which claimed priority from Canadian Application No. 3154534, filed on Apr. 7, 2022, the contents of which are each incorporated by reference herein in their entireties.

FIELD

The present disclosure relates to viscosity measurement and particular to the measurement of the viscosity of very small fluid samples on the order of microliters.

BACKGROUND

Viscosity is a key physical property of a fluid that provides a quantitative measure of the resistance to its flow. It is defined as the ratio of a fluid's shear stress to its shear rate and is related to the internal frictional forces of a fluid's constituent molecules as they move past each other during fluid flow. Viscosity plays an essential role in helping to understand and predict the behavior of fluids used in everyday life and is useful for appropriately designing industrial process controls. Viscosity is an important parameter of particular interest to scientists and engineers working with oil/lubricants, cosmetics, food and beverages, cannabis oils, batteries, and many other biological fluids.

Various techniques have been developed to determine the viscosity of fluids, yet choosing an appropriate method, as described in U.S. Pat. No. 6,898,963 B2 (Irani), is contingent on the test conditions (e.g., the temperature at which the measurement will be made and the fluid volume available for the test) and relevant knowledge of the approximate viscosity of the fluid. Three common types of commercial viscometers are the capillary tube, the coaxial cylinder, and the falling sphere viscometer. A capillary tube viscometer, often in the shape of a U-tube, induces the flow of a test fluid by a pressure differential, and the measured dynamic viscosity is proportional to the time taken for the fluid to flow between two specified points on the tube. Examples of capillary-tube-based viscometers are described in U.S. Pat. No. 9,733,174 B2 (Morhell et al.) and U.S. Pat. No. 6,898,963 B2 (Irani). A coaxial cylinder viscometer, as described in U.S. Pat. No. 5,905,196 (Parshall), induces the shear of sample fluid between two concentric cylinders resulting in a laminar flow condition, and the viscosity of the sample is calculated based on the torque exerted on the inner cylinder due to the viscous forces it endures. Finally, a falling sphere viscometer, often used for transparent Newtonian fluids, operates on a principle that the time taken for a sphere of a given composition to fall through an inclined tube filled with the sample fluid is positively correlated with the fluid's viscosity.

Such previous and conventional viscometers involve certain shortcomings and disadvantages, however. For instance, capillary tube viscometers may be advantageous over coaxial cylinder viscometers in terms of their smaller spatial footprint and lower cost; however, they can be difficult to clean and may become unusable if the sample fluid has a high viscosity or contains granules with diameters comparable to that of the capillary tube. Coaxial cylinder viscometers may be preferred when precise control of the shear rate is desired and are usually adopted due to their ease of use and short measurement times; however, they involve high maintenance costs and must be disassembled and cleaned thoroughly between runs. Falling sphere viscometers may be advantageous over capillary tube viscometers due to their short measurement time, low instrument costs and ease of operation; however, this type of viscometer is limited in the kind of fluids (clear, Newtonian fluids) with which it can work.

Nevertheless, for many applications, one of the most pressing limitations of the above viscometers is the volume of the sample fluid for running a test. Commercial viscometers often require a working volume ranging from 0.5 mL up to 500 mL, which can be an issue if the available volume of the fluid is significantly smaller. For example, it is sometimes necessary and desirable to measure the viscosity of tears, yet the collectable volume of a tear sample is under 10 microliters. Moreover, measurement of the viscosity of a liquid multiple times may be required, but may be too costly to do given the minimum sample volume requirements, especially when the liquids are rare such as some offshore hydrocarbons, cerebrospinal fluids, protein-based therapeutics, and biological fluids.

Rectangular microfluidic-slit-based viscometers have been shown to measure the viscosity of fluids with small volumes. For example, U.S. Pat. No. 7,770,436 B2 (Baek) uses a combination of micro-slit flow channels whose walls are embedded with monolithic pressure sensor arrays. Geometrical changes within the flow channels (or contraction regions) introduce measurable pressure drops and enable measurements of the true viscosity, apparent extensional viscosity, and normal stress difference.

There is, therefore, a pressing and ongoing need for new and improve techniques for measuring the viscosity of very small fluid samples with low volumes, on the order of microliters. Disclosed embodiments may obviate or mitigate one or more disadvantages or shortcomings associated with previous and conventional solutions, or meet or provide for one or more needs or advantages.

SUMMARY

A technique for measuring the viscosity of small volumes of liquid includes an apparatus and a method. A dyed liquid sample is introduced into the loading channel of a microfluidic sample chip that is later housed within a sample chip case. The sample chip case is connected via rigid tubing to a pump. The pump is operable to create a pressure differential across the liquid sample. The compressed air upstream of the liquid sample provides a driving force to propel and flow the liquid sample through the sample channel. As the liquid sample flows through the sample channel, its movement is captured by a camera positioned above the sample chip case which has a window. The captured video is then processed to obtain the sample velocity, and this parameter, along with the known channel dimensions, enables computation of the on-chip volumetric flow rate. The volumetric flow rate of the sample, sample channel dimensions, liquid sample length, capillary pressure, and the differential pressure across the length of the sample are used to calculate the liquid sample's viscosity based on the Hagen-Poiseuille equation with the Weissenberg-Rabinowitsch correction.

Other advantages, features and characteristics of the present invention, as well as methods of operation and functions of the related elements of the structure, and the combination of parts and economies of manufacture, will become more apparent upon consideration of this detailed description with reference to the figures which accompany this application.

BRIEF DESCRIPTIONS OF THE DRAWINGS

The novel features which are believed to be characteristic of the present invention, and related systems and methods according to the present invention, as to their structure, organization, use and method of operation, together with further objectives and advantages thereof, may be better understood from figures which accompany this application, in which presently preferred embodiments of the invention are illustrated by way of example. However, it is expressly understood that any such figures are for the purpose of illustration and description only and not intended as a definition of the limits of the invention. In the accompanying figures:

FIG. 7 is a plan view and FIG. 8 is a perspective view of the assembled sample chip.

Figure 1:
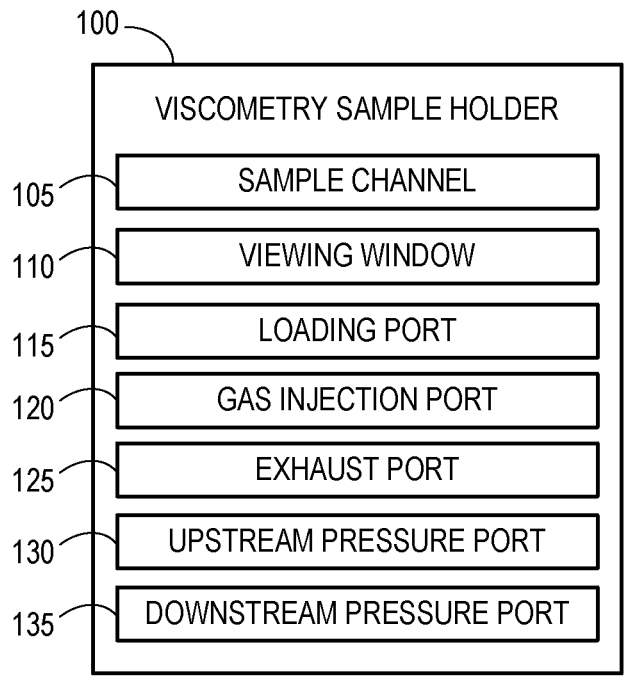
FIG. 1 is a schematic drawing of a viscometry sample holder.

It is to be understood that the accompanying drawings are used for illustrating the principles of the embodiments and exemplifications of the invention discussed below. Hence the drawings are illustrated for simplicity and clarity, and not necessarily drawn to scale and are not intended to be limiting in scope. Reference characters/numbers are used to depict the elements of the invention discussed that are also shown in the drawings. The same corresponding reference characters/numbers are given to a corresponding component or components of the same or similar nature, which may be depicted in multiple drawings for clarity. Text may also be included in the drawings to further clarify certain principles or elements of the invention. It should be noted that features depicted by one drawing may be used in conjunction with or within other drawings or substitute features of other drawings. It should further be noted that common and well-understood elements for creating a commercially viable version of the embodiments of the invention discussed below are often not depicted to facilitate a better view of the principles and elements of the invention discussed below.

DETAILED DESCRIPTION

The present disclosure provides a new and improved technique for the convenient, accurate, and reliable measurement of the viscosity very small fluid samples, with volumes on the order of microliters.

In particular, embodiments of the disclosure employ microfluidics, being that science and technology which deals with systems of integrated microchannels (characterized by width/height scales usually between 100 nm-100 µm) that transport and precisely manipulate small volumes of fluid (usually $10^{-9}$-$10^{-18}$ L).

Figure 2:
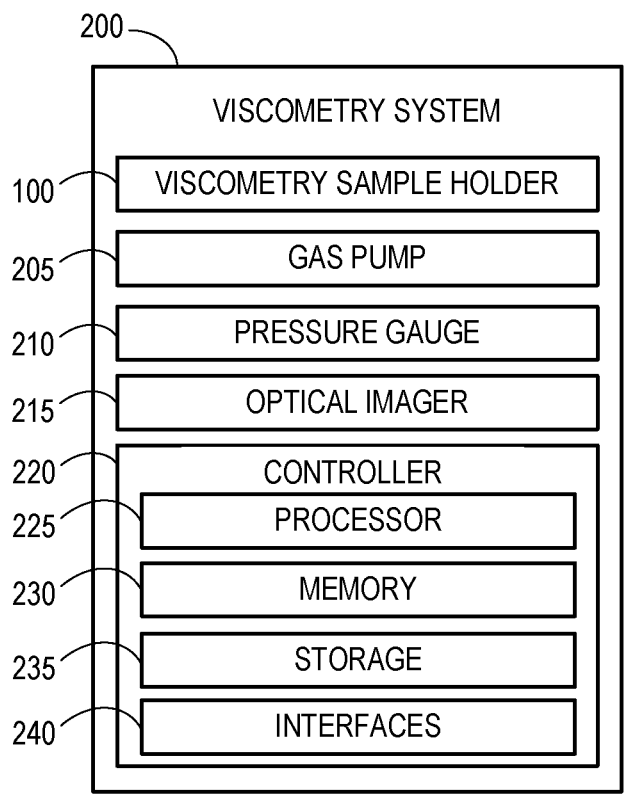
FIG. 2 is a schematic drawing of a viscometry system.
Figure 3:
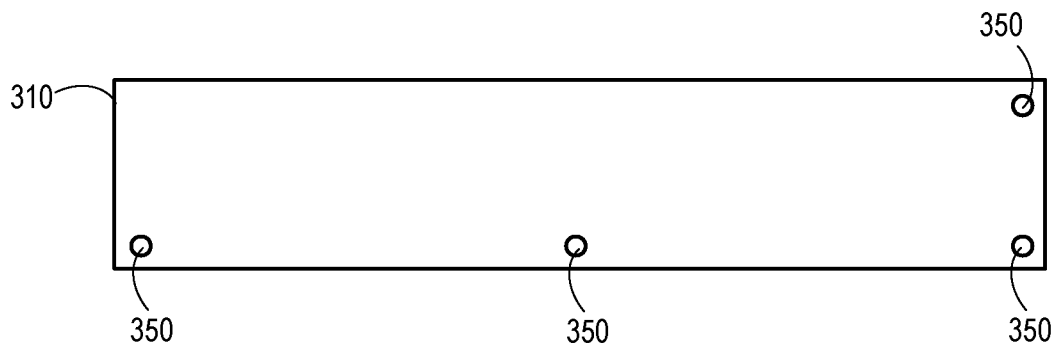
FIGS. 3 to 6 are plan views of different layers of an embodiment of a sample chip.
Figure 4:
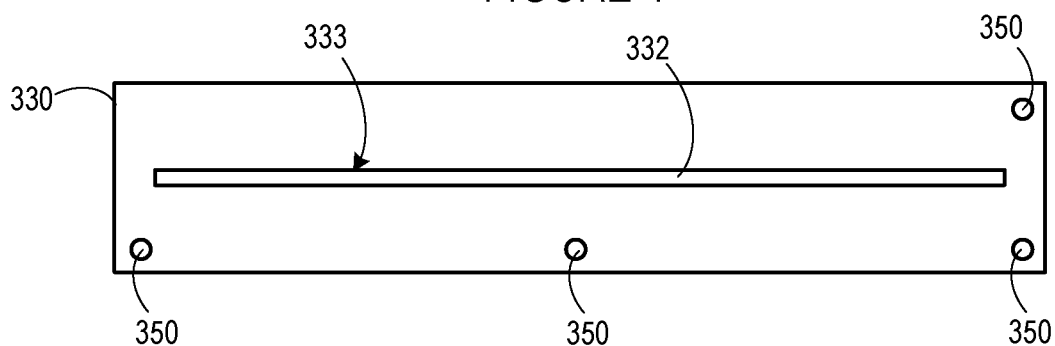
Figure 5:
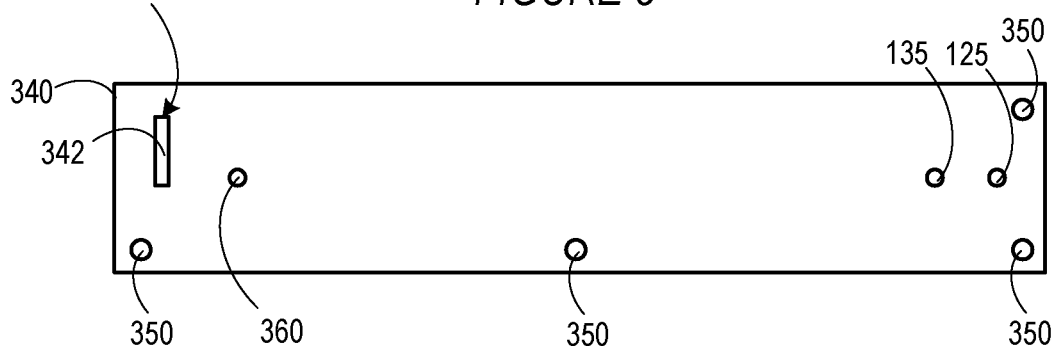
Figure 6:
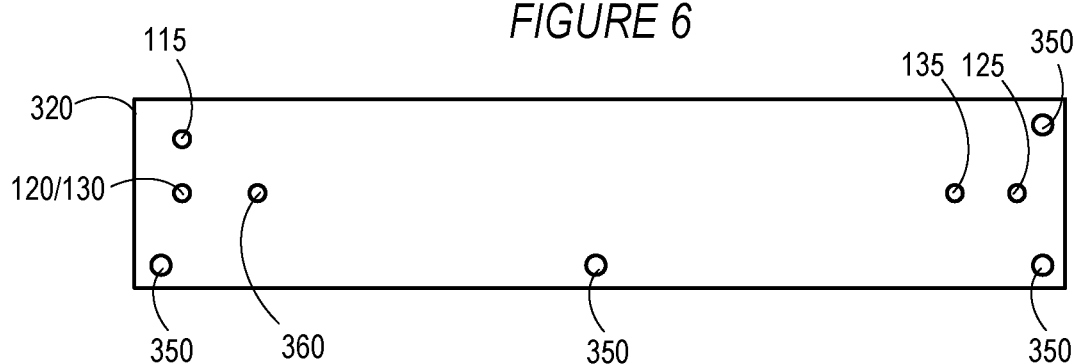

FIG. 1 is a schematic diagram of a viscometry sample holder 100 and FIG. 2 is a schematic diagram of a viscometry system 200. The sample holder 100 has a sample channel 105, a viewing window 110, a loading port 115, a gas injection port 120, an exhaust port 125, an upstream pressure port 130, and a downstream pressure port 135. The system 200 includes the sample holder 100, a gas pump 205, a pressure gauge 210, an optimal imager 215, and a controller 220. In different embodiments, the controller 220 has a processor 225, a memory 230, a storage 235, and one or more interfaces 240.

An embodiment of the sample holder 100 is shown in FIGS. 3 to 11. It includes a sample chip 300 and a sample chip case 400.

The sample chip 300 may have and be formed from a plurality of sample chip layers. Different layers are shown in FIGS. 3 to 6. A plan view of the sample chip 300 is shown in FIG. 7, and a perspective view is shown in FIG. 8. The sample chip 300 has a base layer 310, a cover layer 320, and a sample channel layer 330.

The sample channel layer 330 comprises a sample channel slit opening 332 traversing a thickness of the sample channel layer 330, wherein the sample channel slit opening 332 is defined by a sample channel wall 333. When the sample chip 300 is assembled, the sample channel layer 330 is sandwiched between an upper surface of the base layer 310 and an opposing lower surface of the cover layer 320. The upper surface of the base layer 310, the sample channel wall 333, and the lower surface of the cover layer 320 together define the sample channel 105. The viewing window 110 comprises at least a part of the cover layer 320 adjacent the sample channel 105, which in different embodiments is transparent or semi-transparent.

As mentioned above, the sample holder 100 has a loading port 115, a gas injection port 120, an exhaust port 125, an upstream pressure port 130, and a downstream pressure port 135. In some embodiments, for each one of the plurality of ports, independently, at least one of the base layer 310 or the cover layer 320 comprises that one of the plurality of ports. In the embodiments shown in FIGS. 3 to 8, the cover layer 320 has each one of the mentioned ports.

As shown in FIG. 7, the downstream pressure port 135 is between the upstream pressure port 130 and the exhaust port 125 along a sample channel length L of the sample channel 105. The gas injection port 120 is fluidly coupled to the sample channel 105 at an upstream end 106 of the sample channel 105. In the embodiments shown, the gas injection port 120 is one and the same as the upstream pressure port 130. In other embodiments, the gas injection port 120 is different from the upstream pressure port 130, and the upstream pressure port 130 is between the gas injection port 120 and the downstream pressure port 135 along the length L of the sample channel.

In some embodiments, the loading port 115 is the same as the gas injection port 120 or the upstream pressure port 130, or both. In the embodiments shown in FIGS. 3 to 8, it is different. In some embodiments, the sample chip 300 further has a a loading channel layer 340, shown in FIG. 5. The loading channel layer 340 comprises a loading channel slit opening 342 traversing a thickness of the loading channel layer 340, wherein the loading channel slit opening 342 is defined by a loading channel wall 343. When the sample chip 300 is assembled, the loading channel layer 340 is sandwiched between an upper surface of the sample channel layer 330 and an opposing lower surface of the cover layer 320. The upper surface of the sample channel layer 330, the loading channel wall 343, and the lower surface of the cover layer 320 together define a loading channel 140, shown in FIGS. 7 and 8. In such embodiments, the sample channel layer 330 is sandwiched between an upper surface of the base layer 310 and an opposing lower surface of the loading channel layer 340, and the upper surface of the base layer 310, the sample channel wall 333, and the lower surface of the loading channel layer 340 together define the sample channel 105. The loading channel 140 is fluidly coupled to the loading port 115 at a loading port end 142 of the loading channel 140, and to the upstream end 106 of the sample channel 105 at a sample channel end 144 of the loading channel 140. In the embodiments shown, the loading channel layer 340 further has or forms the exhaust port 125 and the downstream pressure port 135.

The loading port 115, the gas injection port 120, the exhaust port 125, the upstream pressure port 130, and the downstream pressure port 135 may have any suitable dimensions. In different embodiments, one or more of the ports 115,120,125,130,135 has a radius about about 0.01 mm to about 3 mm, or about 0.4 mm to about 1.2 mm, or about 0.8 mm. In some embodiments, the radius of one or more of the ports 115,120,125,130,135 is preconfigured such that sufficient capillary resistance is generated in the respective port 115,120,125,130,135 during measurement to prevent escape of the liquid sample.

In some embodiments, the plurality of sample chip layers have alignment structures configured for alignment of the sample chip layers during assembly and to maintain alignment once assembled. In the embodiments shown, the alignment structures comprise guide holes 350. In other embodiments, the alignment structures include bumps, projections, pins, divots, indentations, ridges, dowels, or any other structures suitable for the described purpose and function.

The sample chip 300 layers 310,320,330,340 may be made by any suitable method and from or using any suitable materials. In some embodiments, one or more of the layers 310,320,330,340 is manufacturing using laser cutting, 3D printing, computer numerical control (CNC) machining, vacuum forming, oven forming, injection molding, or any other suitable method. In particular embodiments the one or more layers are manufactured using laser cutting. In some embodiments, one or more of the layers 310,320,330,340 is made of thermoplastics, which in some embodiments are cured acrylic sheets. In some embodiments, one or more coatings are applied to one or more of the layers 310,320, 330,340. In some embodiments, such coatings are hydrophobic coatings. In some embodiments, one or more adjacent pairs of the layers 310,320,330,340 sandwich adhesive to bond the pair of the layers 310,320,330,340 together.

The sample chip 300 layers 310,320,330,340 may each have any suitable dimensions. In different embodiments, the sample chip 300 layers 310,320,330,340 may each have one or more side dimensions of about 10 mm to about 3000 mm, or about 25 mm to about 150 mm. In different embodiments, one or more of the layers 310,320,330,340 has a thickness of about 50 nm to about 500 µm, or about 100 nm to about 200 µm, or about 100 µm. In some embodiments, the sample channel layer 330 has a thickness of about 100 µm and has double-sided adhesive film applied to both sides providing a total thickness of about 140 µm. The double-sided adhesive firm provides for bonding with the base layer 310 and the cover layer 320, or instead of the loading channel layer 340 if present. In the latter case, in some embodiments an adhesive, which may be a double-sided acrylic adhesive tape, is applied to the loading channel layer 340 prior to laser cutting.

The sample channel 105 may have any suitable dimension, which in different embodiments is about 50 nm to about 500 µm, or about 75 nm to about 200 µm, or about 100 µm. In different embodiments, a sample channel width of the channel is about 100 nm to about 2000 µm, or about 500 nm to about 1500 µm, or about 1000 µm. The sample channel 105 width may be a preconfigured multiple of the sample channel 105 height, which in different embodiments is about 1× to about 20×, or about 5× to about 15×, or about 10×.

Figure 9:
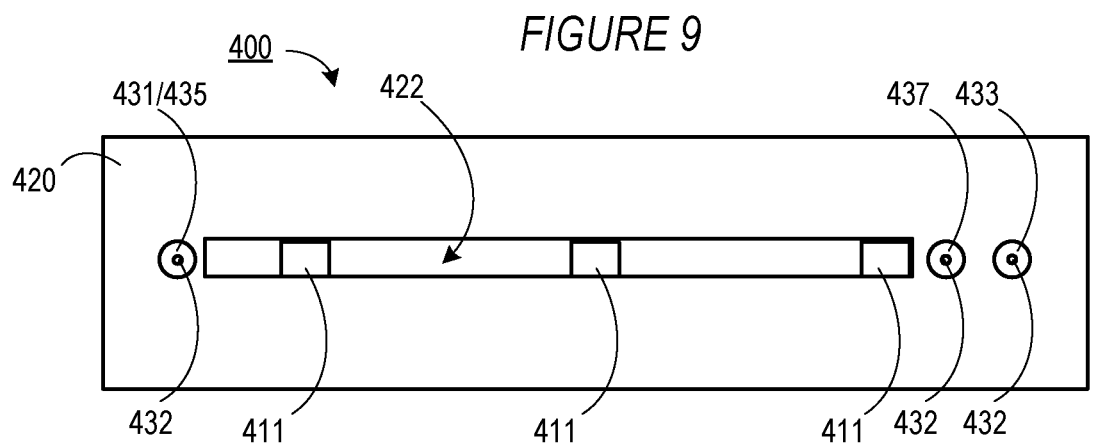
FIG. 9 is a plan view of an assembled sample chip case.
Figure 10:
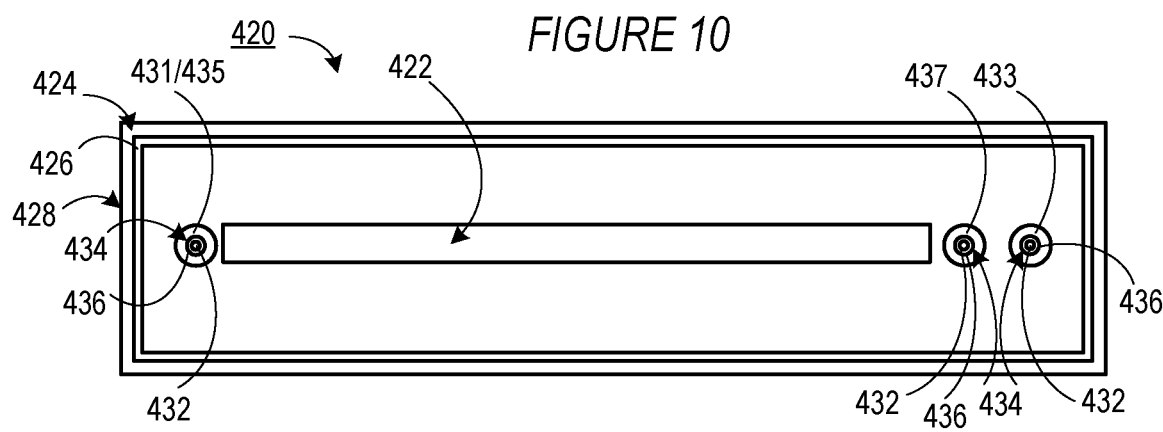
FIGS. 10 and 11 are respective plan views of a sample chip case cover and sample chip case based when assembled form the sample chip case.
Figure 11:
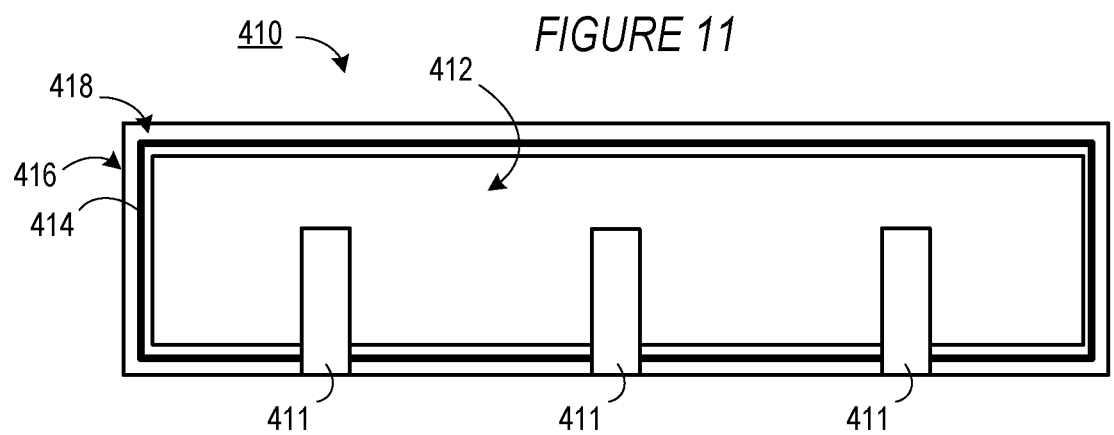

As indicated above, embodiments of the sample holder 100 include a sample chip 300 and a sample chip case 400 configured to enclose the sample chip 300. The sample chip case 400 is shown in FIGS. 9 to 11. The sample chip case 400 has a sample chip case base 410 and a sample chip case cover 420. FIG. 9 shows a plan view of the assembled sample chip case 400 from above the sample chip case cover 420. FIG. 10 shows a plan view of an lower side or underside of the sample chip case cover 420. FIG. 11 shows a plan view of an upper side of the sample chip case base 410.

The sample chip case base 410 and the sample chip case cover 420 are configured for assembly into the sample chip case 400 to define an interior space sized and shaped to fittingly enclose the sample chip 300. Thus, as shown in FIG. 11, the sample chip case base 410 has a sample chip recess 412 sized and shaped to fittingly receive the sample chip 300. Thus, the sample chip recess 412 may have side dimensions which match or very nearly match the side dimensions of the sample chip 300 to enable fitting nesting of the sample chip 300 in the sample chip recess 412 which preventing or minimize lateral movement of the sample chip 300. The sample chip recess 412 may have a depth which matches or very nearly matches the thickness of the sample chip 300 to enable fitting enclosure of the sample chip 300 in the sample chip case 400 when the sample chip 300 is nested in the sample chip recess 412 and the sample chip case base 410 and the sample chip case cover 420 are assembled to form the sample chip case 400, and together with the sample chip 300 to form the sample holder 100. The sample chip case cover 420 comprises a window opening 422 sized, shaped, and positioned for alignment with the at least the part of the sample chip 300 cover layer 320 adjacent the sample channel 105 to provide optical access to the liquid sample in the sample channel 105 when the sample chip 300 is enclosed in the sample chip case 400 and the sample chip case 400 is assembled, wherein the viewing window 110 further comprises the window opening 422.

For each one of the gas injection port 120, the exhaust port 125, the upstream pressure port 130, and the downstream pressure port 135, the sample chip case 400 comprises a respectively corresponding gas injection port coupler 431, exhaust port coupler 433, upstream pressure port coupler 435, and downstream pressure port coupler 437, each being configured for fluid coupling with the corresponding port. Each port coupler 431,433,435,437 forms an airtight seal with the corresponding port 120,125,130,135 when the sample chip 300 is nested in the sample chip case 400 and the sample chip case 400 is assembled. In some embodiments, each port coupler 431,433,435,437 comprises a corresponding pinhole 432 sized, shaped, and configured for fluid coupling with the corresponding port 120,125,130,135, and the port coupler 431,433,435,437 further comprises a corresponding annular groove 434 encircling the pinhole, wherein the annular groove 434 is configured to nest an O-ring 436. The O-ring 436 is compressed between an underside of the port coupler 431,433,435,437 and an opposing surface of the sample chip 300 encircling the corresponding port 120,125,130,135 when the sample chip 300 is enclosed in the sample chip case 400 and the sample chip case 400 is assembled, thereby forming the airtight seal with the port 120,125,130,135. In the embodiments shown, the sample chip case cover 420 comprises the port couplers 431,433,435,437, though in other embodiments one or more of the port couplers 431,433,435,437 is provided in the sample chip case base 410, in order to match the placement of the corresponding ports 120,125,130,135 on the sample chip 300.

In some embodiments, the sample chip case base 410 has a perimeter ridge 414 proximal a perimeter 416 and extending from an upper surface 418 of the sample chip case base 410 opposing a lower surface 424 of the sample chip case cover 420 when the sample chip case 400 is assembled. The sample chip case cover 420 has a perimeter groove 426 proximal a perimeter 428 and extending into the lower surface 424 of the sample chip case cover. The perimeter ridge 414 and the perimeter groove 426 are respectively sized, shaped, and configured for nesting of the perimeter ridge 414 in the perimeter groove 426 when the sample chip case 400 is assembled for alignment of the sample chip case cover 420 and the sample chip case base 410.

The sample chip case 400 may have any suitable structure or device for maintaining assembly of sample chip case base 410 and the sample chip case cover 420. In some embodiments, the sample chip case base 410 and the sample chip case cover 420 snap together and have corresponding cooperative structures. Other structures and mechanism are contemplated. In some embodiments, the sample chip case base 410 has one or more prying grooves 411 formed in the upper surface 418 of the sample chip case base 410 for prying apart the assembled sample chip case cover 420 and the sample chip case base 410 for opening the sample chip case 400.

The sample chip case 400 may be made by any suitable method and from or using any suitable materials. In different embodiments, one or both of the sample chip case base 410 and the sample chip case cover 420 are formed from and made of thermoplastics, which in some embodiments are acrylics, PLA (polyastic acid), PVA (polyvinyl alcohol plastic), PC (polycarbonate), ABS (acrylonitrile butadiene styrene), commercial 3D printing resins, as well as other non-polymer materials like metals (stainless steel, nickel, aluminum), and may be formed by laser cutting, 3D printing, computer numerical control (CNC) machining, vacuum forming, oven forming, injection molding, or any other suitable method.

In some embodiments, the sample chip 300 further has a marking or indicator visible in or adjacent the sample channel 105 to facilitate the loading of liquid samples of a standard volume, which in some embodiments is a sealed standardization port 360. In other embodiments, a simple marker on the sample chip 300 or on the sample chip case 400 is provided.

The sample chip case 400 is useful to hold the sample chip 300 in place and to provide an airtight connection between the ports 115,120,125,130,135 of the sample chip 300 and the gas pump 205 and the pressure gauge 210. The window opening 422 enables optical imaging of the liquid sample as it is flowed through the sample channel 105.

Figure 12:
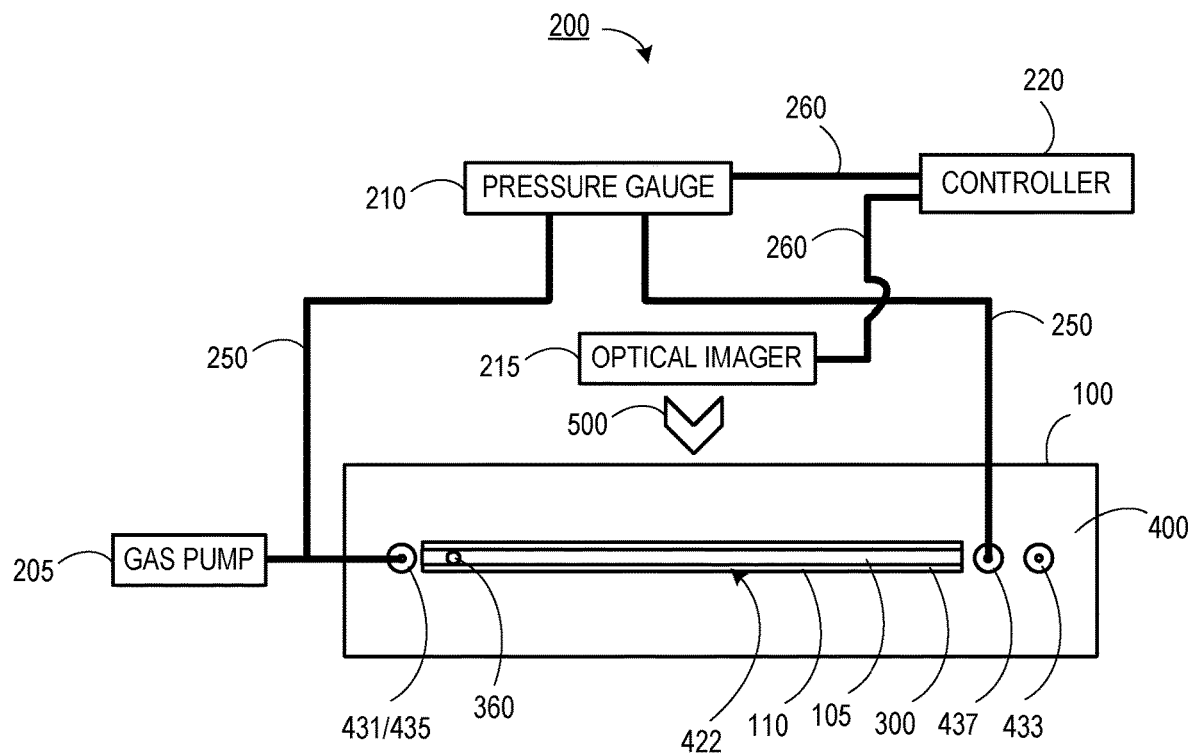
FIG. 12 is a schematic drawing of an embodiment of the viscometry system using the sample chip and sample chip case.

An embodiment of the viscometry system 200 is shown in FIG. 12. In some embodiments, it employs the sample holder 100 embodiments including the sample chip 300 and sample chip case 400 described above. The system 200 includes a gas pump 205 fluidly coupled to the gas injection port coupler 431, which in some embodiments is by rigid tubing 250 and suitable fittings, and is operable to inject gas, which in some embodiments is air, through the gas injection port coupler 431 and the gas injection port 120 into the sample channel 105 to flow a liquid sample under pressure in the sample channel 105. Any suitable gas pump 205 may be used, and in some embodiments is a syringe pump. The pressure gauge 210 is coupled to the upstream pressure port coupler 435 and the downstream pressure port coupler 437, which in some embodiments is by rigid tubing 250 and suitable fittings, and is operable to measure a differential pressure based on the upstream pressure in the sample channel 105 adjacent the upstream pressure port 130 and the downstream pressure in the sample channel 105 adjacent the downstream pressure port 135. The rigid tubing 250 has any suitable dimensions and materials, and may be configured so as to minimize or prevent pressure fluctuations during measurement. The pressure gauge 210 may be any suitable device operable to measure a differential pressure, and in some embodiments is a differential pressure transducer. The optical imager 215 is positioned facing the viewing window 110 (illustrated by chevron 500) and is operable to optically image the liquid sample in the sample channel 105 through the viewing window 110. The controller 220 is communicatively coupled to the pressure gauge 210 by communication connections 260, which may be wired or wireless connections, to receive differential pressure measurement signals from the pressure gauge 210, and to the optical imager 215 to receive optical sample image signals from the optical imager 215. In some embodiments, the controller 220 is a computer equipped with a data acquisition (DAQ) card communicately coupled to the pressure gauge 210 and the optical imager 215. The controller 220 is further operable to compute the viscosity of the liquid sample in the sample channel 105 based on the differential pressure measurement signals and the optical sample image signals. In some embodiments, one or more of the gas pump 205, the pressure gauge 210, the optical imager 215, and the controller 220 are coupled to one or more power supplies (not shown).

In some embodiments, the optical imager 215 comprises a camera operable to generate a video signal of the liquid sample while flowing in the sample 105 channel, wherein the optical sample image signals comprise the video signal. In other embodiments, the optical imager 215 comprises a camera operable to capture a sequence of images of the liquid sample while flowing in the sample channel 105, wherein the optical sample image signals comprise the sequence of images.

Figure 13:
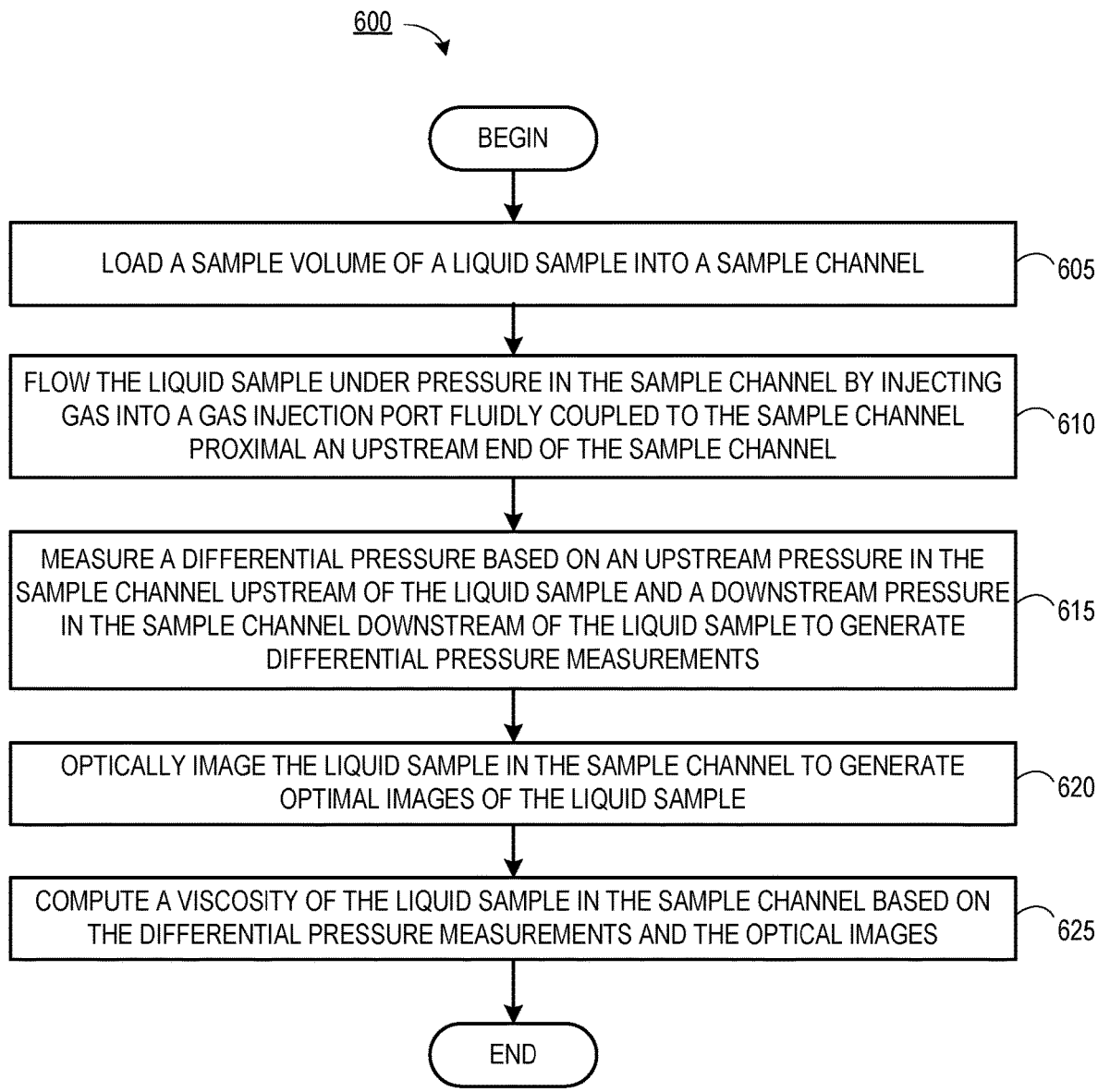
FIG. 13 is a flowchart of a method of measuring the viscosity of a liquid sample.

A flowchart of a method 600 of measuring the viscosity of a liquid sample is shown in FIG. 13. A sample volume of the liquid sample is loaded into the sample channel 105 (step 605). The sample volume may be any suitable amount, and in different embodiments is about 0.1 μL to about 100 μL, or about 1 μL to about 10 μL. The liquid sample is flowed under pressure in the sample channel 105 by injecting gas, which in some embodiments is air, into the gas injection port 120 fluidly coupled to the sample channel 105 proximal the upstream end 106 of the sample channel 105 (step 610). A differential pressure is measured based on an upstream pressure in the sample channel 105 upstream of the liquid sample and a downstream pressure in the sample channel 105 downstream of the liquid sample to generate differential pressure measurements (step 615). The liquid sample is optically imaged in the sample channel 105 to generate optimal images of the liquid sample (step 620). A viscosity of the liquid sample in the sample channel 105 is computed based on the differential pressure measurements and the optical images (step 625).

In some embodiments, the liquid sample is dyed. In different embodiments, the liquid sample comprises about 1 v/v % to about 99 v/v %, or about 10 v/v % to about 20 v/v %, or about 16 v/v % of a dye.

In some embodiments, the method 600 is performed using the viscometry system 200. When the system 200 includes the sample 100 having the loading channel 140, in some embodiments loading the liquid sample into the sample channel 105 includes pipetting the liquid sample into the sample channel 105 via the loading port 115. In some embodiments a preconfigured sample volume of the liquid sample is injected, which in some embodiments is by pipetting. In some embodiments, the liquid sample is flowed through the loading channel 140 into the sample channel 105. In order to standardize the liquid volume between measurements, the liquid sample may be loaded up to the marking or indicator visible in or adjacent the sample channel 105 to facilitate the loading of liquid samples of a standard volume. In some embodiments, this is the sealed standardization port 360.

In embodiments where the loading port 115 and the gas injection port 120 are different, and which have the loading channel 140, the gas injection port 120 is sealed while the liquid sample is loaded into the sample channel 105 as described above. The gas injection port 120 is then opened or unsealed. In some embodiments, the loading port 115 is then sealed. During measurement, the exhaust port coupler 433 is open and the exhaust port 125 is unsealed, thereby providing a pressure exhaust to the sample channel 105 as the liquid sample is flowed through the sample channel 105.

In some embodiments, at the beginning of a measurement, the liquid sample is loaded into the sample chip 300, which is then placed in the sample chip case 400 as described herein, to form the sample holder 100. The sample holder 100 is then coupled to the gas pump 205 and the pressure gauge 210 as described herein. The sample holder 100 and the optical imager 215 are respectively placed for imaging of the liquid sample by the optical imager 215 as it is flowed through the sample channel 105.

In some embodiments, a perspective shift of the optical imager 215 is determined and quantified. In some embodiments, a line of known length is provided on a top side of the sample holder 100, and an image of it is captured taken of it using the optical imager 215. A correction coefficient C is calculated by:

$$C = \frac{L_{known}}{L_{captured}} \quad (1)$$

where $L_{known}$ is the known length of the line and $L_{captured}$ is the length of the line in the captured image. When the liquid sample length is calculated, the measured length from the image is multiplied by this correction factor to account for the visual bias of the optical imager 215. If the optical imager 215 is shifted away relative to the sample holder 100, the visual bias correction coefficient may be changed and may need to be re-evaluated.

Figure 14:
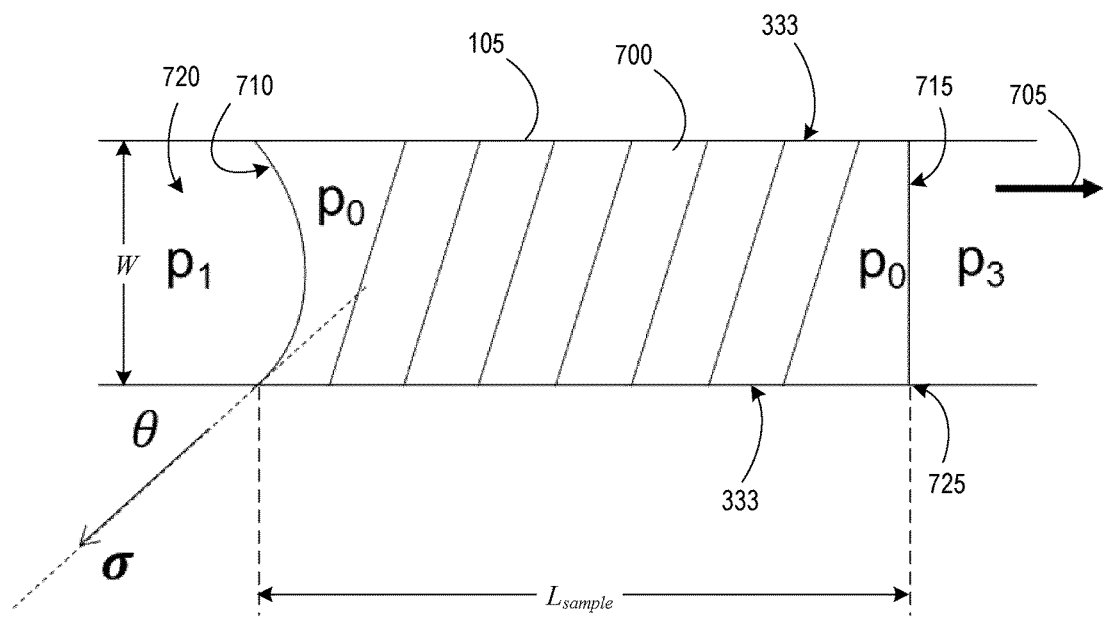
FIG. 14 is a diagram illustrating a liquid sample flowing through a sample channel.

FIG. 14 shows a schematic diagram of a liquid sample 700 being flowed through the sample channel 105. Arrow 705 illustrates a direction of the flow, which is in the direction from the upstream pressure port 130 toward the downstream pressure port 135. In some embodiments the liquid sample 700 is flowed in such a way that it is in flow equilibrium.

When performing the method 600, the gas pump 205, the pressure gauge 210, and the optical imager 215 are operated concurrently, while the controller 220 receives the differential pressure measurement signals from the pressure gauge 210 and the optical sample image signals from the optical imager 215. In some embodiments, the controller 220 is operable to control the operation of one or more of the gas pump 205, the pressure gauge 210, and the optical imager 215. In other embodiments, one or more of the gas pump 205, the pressure gauge 210, and the optical imager 215 are operated independently. The gas pump 205 may be operated to flow the liquid sample 700 in the sample channel 105 at a constant flow rate. Any suitable flow rate may be used, which in different embodiments is about 10 to 100 microliters/min. As the liquid sample 700 is flowed through the sample channel 105, upstream air 720 which is upstream of the liquid sample 700 is compressed. As the upstream air 720 reaches a threshold pressure $p_1$, it forces the liquid sample 700 to flow downstream in the sample channel 105, in the direction of arrow 705. While the liquid sample 700 is flowed in this way, it is optically imaged by the optimal imager 215 through the viewing window 110.

Without wishing to be bound by theory, the propelling force of the liquid sample 700, i.e., the total pressure difference $\Delta P = p_1 - p_3$ created by the gas pump 205, is opposed by three forces: a viscous force (which is of interest), a drag (which is mainly caused by the sample channel 105 roughness and adhesion), and a capillary force. As discussed above, in order to minimize noise from drag, a channel coating may be applied to render the sample channel 105 smooth and hydrophobic. The capillary force may be calculated from a capillary pressure difference and may be subtracted from the total pressure difference measured by the pressure gauge 210.

In this connection, the liquid sample 700 has an upstream air-liquid interface 710, and a downstream air-liquid interface 715. The downstream air-liquid interface 715 may have a zero or near-zero advancing dynamic contact angle measured at the contact point 725 of the three phases involving the air, liquid and the sample channel wall 333. In some embodiments, the sample channel wall 333 is provided with a hydrophobic coating to achieve this condition or to tend to do so. The upstream air-liquid interface 710 may have a contact angle θ with the sample channel wall 333 which is non-zero and is determined by the controller 220 based on the optical sample image signals generated by the optical imager 215. In some embodiments, the controller 220 is operable to determine the contact angle θ repeatedly, which may be periodically, based on the optical sample image signals as the liquid sample 700 is flowed, and to compute an average contact angle θ. In some embodiments, where the optical sample image signals comprise a video, a characteristic contact angle θ is averaged by the controller 220 from all the individual contact angles measured from each time-step of the video that has manifested the flow equilibrium state of the liquid sample 700.

The controller 220 is operable to compute a capillary pressure difference $\Delta P_{capillary}$ across the upstream air-liquid interface 710 according to the Young-Laplace equation as follows:

$$\Delta P_{capillary} = p_1 - p_0 = \frac{2\sigma\cos\theta}{R} \quad (2)$$

where σ is the known surface tension of the liquid sample 700, and ⁻R is the hydraulic radius of the sample channel 105, given by:

$$^-R = \frac{1}{\frac{1}{H} + \frac{1}{W}} \quad (3)$$

where H (not shown) and W are the height and width of the sample channel 105, respectively.

As noted above, dynamic viscosity of the liquid sample 700 is the ratio of the shear stress $\tau_w$ and shear rate $\dot{\gamma}$ at the sample channel wall 333, which are calculated by:

$$\tau_w = \frac{H(\Delta P - \Delta P_{capillary})}{2\left(1 + \frac{H}{W}\right)L_{sample}} \quad (4)$$

$$\dot{\gamma} = \frac{6Q}{\left(1 + \frac{H}{W}\right)WH^2} \quad (5)$$

where ΔP is the differential pressure measured by the pressure gauge 210, $\Delta P_{capillary}$ is the capillary pressure difference calculated according to Equation 2 above, $L_{sample}$ is the length in the sample channel 105 of the liquid sample 700 (which may be corrected using correction coefficient C, described above), and the volumetric flow rate Q of the liquid sample 700 is calculated by:

$$Q = HW\bar{v} \quad (6)$$

where $\bar{v}$ is the average sample velocity v of the liquid sample 700 flow in the sample channel, which the controller 220 may be further operated to determine based on the received optical sample image signals.

In different embodiments, the controller 220 is operable to process the differential pressure measurement signals received from the pressure gauge 210 and the optical sample image signals received from the optical imager 215 to compute the viscosity of the liquid sample either in real-time—while the differential pressure measurement signals and the optical sample image signals are received by the controller 220—or in post-processing after the differential pressure measurement signals and the optical sample image signals are received by the controller 220. The controller 220 processes the optical sample image signals to determine a time period over which the fluid sample 700 is flowed through the sample channel 105 at a constant or near-constant velocity v, and based on this computes the average sample velocity average $\bar{v}$. For this purpose, the controller 220 in some embodiments, wherein the optical sample image signals comprise video or a sequence of images, tracks the downstream air-liquid interface 715 as it moves through the sample channel 105 by placing markers at equally spaced frames in the video or sequence of images. During each of these time steps, the controller 220 also determines the upstream air-liquid interface 710 contact angle θ and liquid sample 700 length $L_{sample}$. The controller 220 then computes the shear stress $\tau_w$ and shear rate $\dot{\gamma}$, and the ratio thereof as the viscosity of the liquid sample 700, based on averages of the aforementioned parameters.

Figure 15:
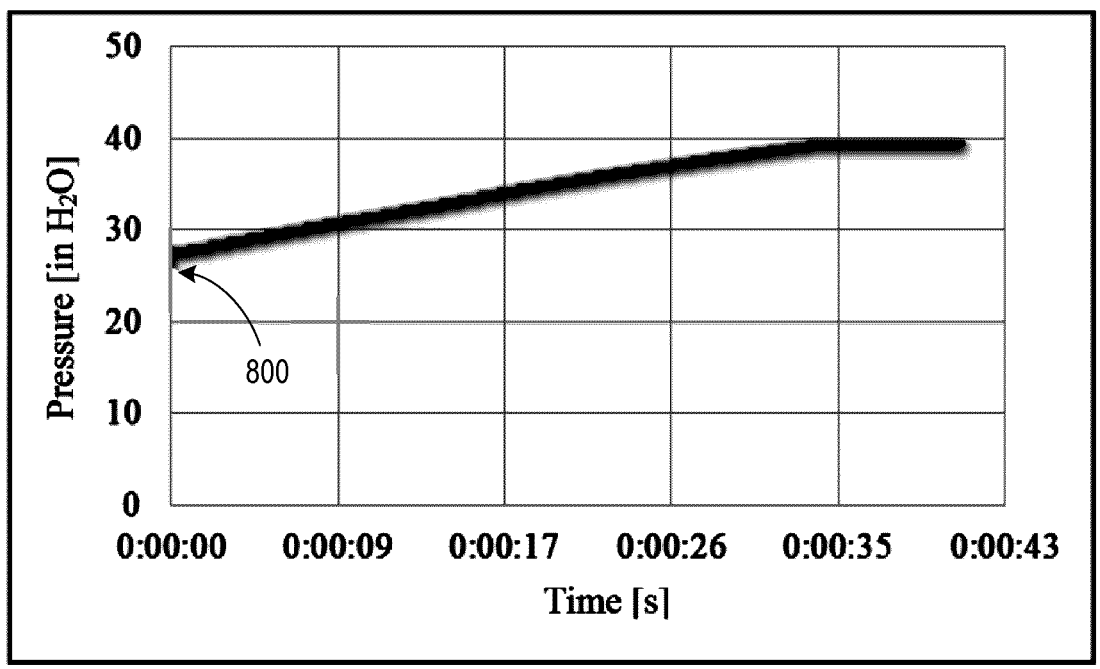
FIG. 15 is a chart showing measurements of a differential pressure of a liquid sample flowed through a sample channel over time.

FIG. 15 shows a chart of experimental data of measured differential pressure of a liquid sample flowed in a sample channel as described herein. As discussed, in embodiments an average value of the differential pressure measurement over the time period that the liquid sample is flowed at a constant velocity is used in the viscosity calculation. In some embodiments, this averaged pressure is subtracted from a baseline pressure 800 (caused by a pressure offset in the pressure transducer) in order to be used in the shear stress Equation 4 to calculate the viscosity.

Figure 16:
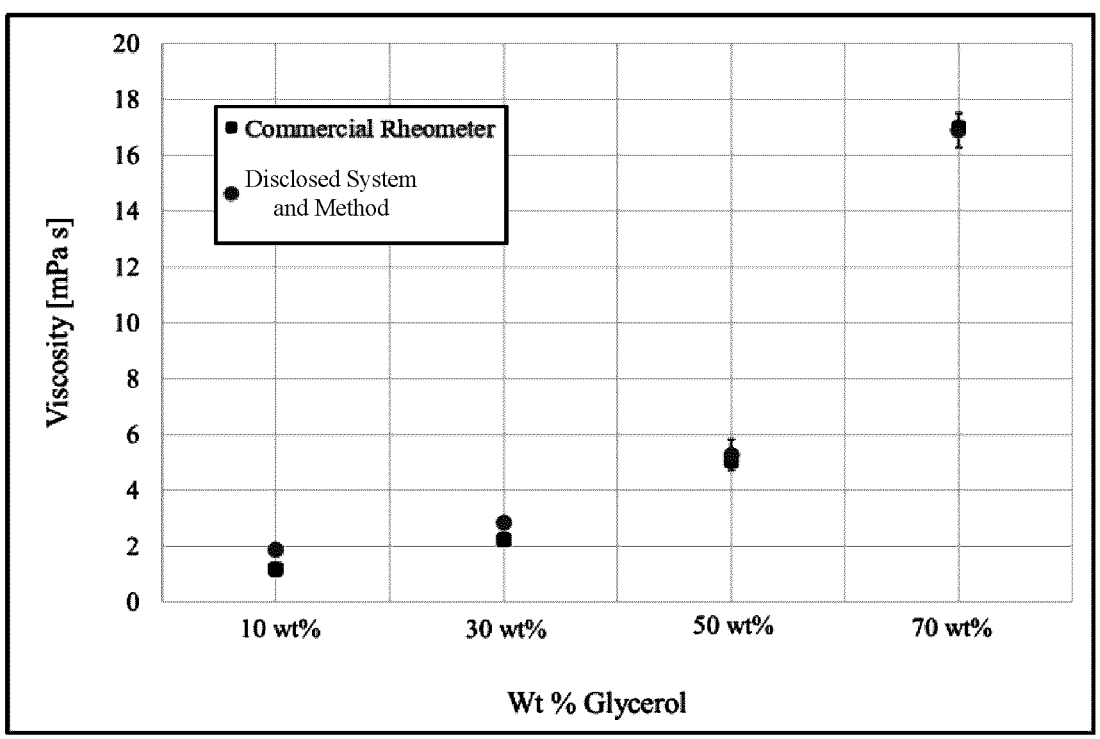
FIG. 16 is a chart showing experimental viscosity measurements of a test liquid by a disclosed system and by a commercially-available rheometer.

FIG. 16 shows a chart of experimental data of determinations of the viscosity of four different weight percent glycerol solutions ranging from 10 wt % to 70 wt %. Determinations were performed both by the system 200 and method 600 as described herein, and also for comparison using a commercially-available cone/plate rheometer (Model: LVDV-III+; Brookfield Engineering Laboratories Inc, Middleboro, MA, USA) to validate the efficacy of the disclosed techniques. Glycerol solution was chosen because it is Newtonian fluid—its viscosity is independent of the applied shear rate, so the viscosity measurements can be compared to the commercial rheometer irrespective of deviations in the shear rate. As shown in the chart, the determinations performed by the disclosed system 200 and method 600 agree or nearly agree with the measurements performed using the commercially-available rheometer.

Embodiments of the present disclosure enable the convenient, accurate, and reliable measurement of the viscosity of a liquid sample having a very small volume, which may be on the order of a few microliters. The disclosed sample holder may itself be very small, thereby imposing reduced space requirements. The disclosed sample holder and system may require little to no maintenance, and may require no calibration fluids. As against known and conventional methods, embodiments of the disclosure may help to reduce reagent consumption, provide faster assay times, and lower cost.

In particular, embodiments of the present disclosure differ from previous and conventional rectangular slit viscometers by using only one microfluidic sample chip, whereas the latter sometimes use multiple chips. Moreover, manufacture of the disclosed sample chip may be more convenient, easier, and cost-effective in that the sample chip is, in some embodiments, an assembly of a few laser-cut layers that are bonded together by adhesives. Finally, while previous and conventional viscometers often utilize an array of pressure sensors built into the microchannel walls which can introduce surface roughness thereby causing an overestimation of the shear stress on the sample, and may further lead to degradation of the long-term performance of the device, embodiments of the present disclosure may overcome these disadvantages by providing a hydrophobic coating to the sample channel wall and using a single pressure gauge, which in embodiments is a pressure transducer, outside of the sample chip, the latter of which is achieved by using a sample chip case to connect the pressure ports of the sample chip with the terminals of the pressure gauge.

Non-limiting embodiments of the present disclosure are as follows.

Embodiment 1. A viscometry sample holder comprising: a sample channel configured to flow a liquid sample under pressure, the sample channel having an upstream end and a downstream end opposite the upstream end along a length of the sample channel; a viewing window providing optical access to the liquid sample in the sample channel; and a plurality of ports comprising: a loading port fluidly coupled to the sample channel proximal the upstream end of the sample channel for loading the liquid sample into the sample channel; a gas injection port fluidly coupled to the sample channel proximal the upstream end of the sample channel for injecting a gas into the sample channel; an exhaust port fluidly coupled to the sample channel proximal the downstream end of the sample channel; an upstream pressure port proximal the upstream end of the sample channel and coupled for measuring an upstream pressure in the sample channel adjacent the upstream pressure port; and a downstream pressure port proximal the downstream end of the sample channel and coupled for measuring a downstream pressure in the sample channel adjacent the downstream pressure port.

Embodiment 2. The viscometry sample holder of Embodiment 1, wherein the downstream pressure port is between the upstream pressure port and the exhaust port along the length of the sample channel.

Embodiment 3. The viscometry sample holder of Embodiment 1 or 2, wherein the gas injection port is fluidly coupled to the sample channel at the upstream end of the sample channel.

Embodiment 4. The viscometry sample holder of any one of Embodiments 1 to 3, wherein the gas injection port is the upstream pressure port.

Embodiment 5. The viscometry sample holder of any one of Embodiments 1 to 3, wherein the gas injection port is different from the upstream pressure port, and the upstream pressure port is between the gas injection port and the downstream pressure port along the length of the sample channel.

Embodiment 6. The viscometry sample holder of any one of Embodiments 1 to 5, wherein the sample channel has a sample channel height of about 75 nm to about 200 µm.

Embodiment 7. The viscometry sample holder of any one of Embodiments 1 to 5, wherein the sample channel has a sample channel height of about 100 µm.

Embodiment 8. The viscometry sample holder of Embodiment 6 or 7, wherein the sample channel has a sample channel width of about 5× to about 15× of the sample channel height, or about 10×.

Embodiment 9. The viscometry sample holder of Embodiment 6 or 7, wherein the sample channel has a sample channel width of about 10× of the sample channel height.

Embodiment 10. The viscometry sample holder of any one of Embodiments 1 to 7, wherein the sample channel has a sample channel width of about 500 nm to about 1500 µm.

Embodiment 11. The viscometry sample holder of any one of Embodiments 1 to 7, wherein the sample channel has a sample channel width of about 1000 µm.

Embodiment 12. The viscometry sample holder of any one of Embodiments 1 to 11, comprising a sample chip, the sample chip comprising a plurality of sample chip layers comprising: a base layer; a cover layer; and a sample channel layer sandwiched between an upper surface of the base layer and an opposing lower surface of the cover layer, wherein: the sample channel layer comprises a sample channel slit opening traversing a thickness of the sample channel layer, wherein the sample channel slit opening is defined by a sample channel wall; the viewing window comprises at least a part of the cover layer adjacent the sample channel; and for each one of the plurality of ports, independently, at least one of the base layer or the cover layer comprises that one of the plurality of ports.

Embodiment 13. The viscometry sample holder of Embodiment 12 further comprising a hydrophobic coating provided on the sample channel wall.

Embodiment 14. The viscometry sample holder of Embodiments 12 or 13, wherein one or more of the base layer, the cover layer, and the sample channel layer are formed of acrylic.

Embodiment 15. The viscometry sample holder of any one of Embodiments 12 to 15, wherein one or more of the base layer, the cover layer, and the sample channel layer are made using laser cutting.

Embodiment 16. The viscometry sample holder of any one of Embodiments 12 to 15, wherein the upper surface of the base layer, the sample channel wall, and the lower surface of the cover layer together define the sample channel.

Embodiment 17. The viscometry sample holder of any one of Embodiments 12 to 15, wherein the plurality of sample chip layers further comprises: a loading channel layer comprising a loading channel fluidly coupled: to the loading port at a loading port end of the loading channel; and to the upstream end of the sample channel at a sample channel end of the loading channel, wherein an upper surface of the sample channel layer, the sample channel wall, and the lower surface of the cover layer together define the sample channel.

Embodiment 18. The viscometry sample holder of Embodiment 17, wherein the loading channel layer is formed of acrylic.

Embodiment 19. The viscometry sample holder of Embodiment 17 or 18, wherein the loading channel layer is made using laser cutting.

Embodiment 20. The viscometry sample holder of any one of Embodiments 12 to 19, wherein the at least the part of the cover layer adjacent the sample channel is transparent.

Embodiment 21. The viscometry sample holder of any one of Embodiments 12 to 19, wherein the at least the part of the cover layer adjacent the sample channel is semi-transparent.

Embodiment 22. The viscometry sample holder of any one of Embodiments 12 to 21, wherein the cover layer comprises each one of the plurality of ports.

Embodiment 23. The viscometry sample holder of any one of Embodiments 12 to 22, wherein the plurality of sample chip layers comprises alignment structures configured for alignment of the plurality of sample chip layers.

Embodiment 24. The viscometry sample holder of Embodiment 23, wherein the alignment structures comprise guide holes.

Embodiment 25. The viscometry sample holder of any one of Embodiments 12 to 24, further comprising a sample chip case configured to enclose the sample chip, the sample chip case comprising a sample chip case base and a sample chip case cover, wherein: the sample chip case base and a sample chip case cover are respectively configured for assembly to define an interior space sized and shaped to fittingly enclose the sample chip; the sample chip case cover comprises a window opening sized, shaped, and positioned for alignment with the at least the part of the cover layer adjacent the sample channel, to provide the optical access to the liquid sample in the sample channel when the sample chip is enclosed in the sample chip case and the sample chip case is assembled, wherein the viewing window further comprises the window opening; and for each one of the plurality of ports, the sample chip case comprises a corresponding port coupler configured for fluid coupling with the corresponding port.

Embodiment 26. The viscometry sample holder of Embodiment 25, wherein for each one of the plurality of the ports, the corresponding port coupler forms an airtight seal with the port when the sample chip is enclosed in the sample chip case and the sample chip case is assembled.

Embodiment 27. The viscometry sample holder of Embodiment 26, wherein for each one of the plurality of the ports, the corresponding port coupler comprises a pinhole sized, shaped, and configured for fluid coupling with the port, and the port coupler further comprises an annular groove encircling the pinhole, wherein the annular groove is configured to nest an O-ring, wherein the O-ring is compressed between an underside of the port coupler and an opposing surface of the sample chip encircling the port when the sample chip is enclosed in the sample chip case and the sample chip case is assembled, thereby forming the airtight seal with the port.

Embodiment 28. The viscometry sample holder of any one of Embodiments 25 to 27, wherein the sample chip case cover comprises the port couplers.

Embodiment 29. The viscometry sample holder of any one of Embodiments 25 to 28, wherein the sample chip case base comprises a perimeter ridge proximal a perimeter of the sample chip case base and extending from an upper surface of the sample chip case base opposing a lower surface of the sample chip case cover when the sample chip case is assembled, the sample chip case cover comprises a perimeter groove proximal a perimeter of the sample chip case cover and extending into the lower surface of the sample chip case cover, wherein the perimeter ridge and the perimeter groove are respectively sized, shaped, and configured for nesting of the perimeter ridge in the perimeter groove when the sample chip case is assembled for alignment of the sample chip case cover and the sample chip case base.

Embodiment 30. The viscometry sample holder of any one of Embodiments 25 to 29, wherein the sample chip case base comprises one or more prying grooves formed in the upper surface of the sample chip case base for prying apart the assembled sample chip case cover and the sample chip case base.

Embodiment 31. A viscometry system comprising: the viscometry sample holder of any one of Embodiments 1 to 30; a gas pump fluidly coupled to the gas injection port and operable to inject the gas into the sample channel to flow the liquid sample under pressure in the sample channel; a pressure gauge coupled to the upstream pressure port and the downstream pressure port and operable to measure a differential pressure based on the upstream pressure and the downstream pressure; an optical imager operable and positioned to optically image the liquid sample in the sample channel through the viewing window; and a controller: coupled to the pressure gauge to receive differential pressure measurement signals from the pressure gauge; coupled to the optical imager to receive optical sample image signals from the optical imager; and operable to compute a viscosity of the liquid sample in the sample channel based on the differential pressure measurement signals and the optical sample image signals.

Embodiment 32. The viscometry system of Embodiment 31, wherein the optical imager comprises a camera operable to generate a video signal of the liquid sample while flowing in the sample channel, wherein the optical sample image signals comprise the video signal.

Embodiment 33. The viscometry system of Embodiment 31, wherein the optical imager comprises a camera operable to capture a sequence of images of the liquid sample while flowing in the sample channel, wherein the optical sample image signals comprise the sequence of images.

Embodiment 34. The viscometry system of any one of Embodiments 31 to 33, wherein the controller is operable: to determine an average sample velocity of the liquid sample while flowing in the sample channel based on the optical sample image signals; and to compute the viscosity of the sample in the channel based on the differential pressure measurement signals and the determined average sample velocity of the liquid sample while flowing in the sample.

Embodiment 35. The viscometry system of Embodiment 34, wherein the controller is operable: to determine a length of the liquid sample while flowing in the sample channel based on the optical sample image signals; and to compute the viscosity of the sample in the channel based on the differential pressure measurement signals, the determined average sample velocity of the liquid sample while flowing in the sample, and the length of the liquid sample while flowing in the sample channel.

Embodiment 36. The viscometry system of Embodiment 35, wherein the controller is operable: to compute a shear stress of the liquid sample while flowing in the sample channel based on the differential pressure measurement signals, the length of the liquid sample while flowing in the sample channel, and cross-sectional dimensions of the sample channel; to compute a shear rate of the liquid sample while flowing in the sample channel based on the determined average sample velocity of the liquid sample while flowing in the sample, and the cross-sectional dimensions of the sample channel; and to computer the viscosity of the sample in the channel based on the computer shear stress and the computed shear rate.

Embodiment 37. The viscometry system of Embodiment 36, wherein: the optical imager is operable to optically image an upstream air-liquid interface of the liquid sample; and the controller is operable: to determine a dynamic contact angle of the upstream air-liquid interface with a sidewall of the sample channel based on the optical sample image signals; and to compute the viscosity of the sample in the channel based at least in part on the dynamic contact angle.

Embodiment 38. The viscometry system of Embodiment 37, wherein the controller is operable: to compute a capillary pressure difference based on the determined dynamic contact angle of the upstream air-liquid interface, a surface tension of the liquid sample, and a hydraulic radius of the sample channel; and to compute the shear stress based in part on the computed capillary pressure difference.

Embodiment 39. The viscometry system of Embodiment 38, wherein the controller is operable to compute the viscosity as the ratio of the shear stress $\tau_w$ and shear rate $\dot{\gamma}$ at the sample channel wall according to:

$$\tau_w = \frac{H(\Delta P - \Delta P_{capillary})}{2\left(1 + \frac{H}{W}\right)L_{sample}} \quad (4)$$

$$\dot{\gamma} = \frac{6Q}{\left(1 + \frac{H}{W}\right)WH^2} \quad (5)$$

where $\Delta P$ is the differential pressure measured by the pressure gauge, $L_{sample}$ is the length in the sample channel of the liquid sample, the volumetric flow rate Q of the liquid sample is:

$$Q = HW\bar{v} \quad (6)$$

where $\bar{v}$ is the average sample velocity v of the liquid sample flow in the sample channel, and $\Delta P_{capillary}$ is the capillary pressure difference according to:

$$\Delta P_{capillary} = \frac{2\sigma\cos\theta}{\bar{R}} \quad (2)$$

where $\sigma$ is the surface tension of the liquid sample and $\bar{R}$ is the hydraulic radius of the sample channel determine by:

$$\bar{R} = \frac{1}{\frac{1}{H} + \frac{1}{W}} \quad (3)$$

Embodiment 40. A method of measuring the viscosity of a liquid sample, the method comprising: flowing a liquid sample under pressure in a sample channel by injecting gas into an upstream end of the sample channel; measuring a differential pressure based on an upstream pressure in the sample channel upstream of the liquid sample and a downstream pressure in the sample channel downstream of the liquid sample to generate differential pressure measurements; optically imaging the liquid sample in the sample channel to generate optimal images of the liquid sample; and computing a viscosity of the liquid sample in the sample channel based on the differential pressure measurements and the optical images.

Embodiment 41. The method of Embodiment 40, wherein the liquid sample is dyed.

Embodiment 42. The method of Embodiment 41, wherein the liquid sample comprises about 10 v/v % to about 20 v/v % of a dye.

Embodiment 43. The method of any one of Embodiments 40 to 42, wherein: the optical images of the liquid sample include a downstream air-liquid interface of the liquid sample and an upstream air-liquid interface of the liquid sample; and computing the viscosity of the liquid sample in the sample channel based on the differential pressure measurements and the optical images comprises: determining a sample length of the liquid sample in the sample channel based on the downstream air-liquid interface of the liquid sample and the upstream air-liquid interface of the liquid sample; determining a sample velocity of the liquid sample in the sample channel based on at least one of the downstream air-liquid interface of the liquid sample and the upstream air-liquid interface of the liquid sample; determining a contact angle of the upstream air-liquid interface of the liquid sample with a sample channel wall of the sample channel; and computing the viscosity of the liquid sample in the sample channel based at least partly on the differential pressure measurements, the sample length, the sample velocity, the contact angle, a sample channel height of the sample channel, and a sample channel width of the sample channel.

Embodiment 44. The method of Embodiment 43, wherein computing the viscosity of the liquid sample in the sample channel based at least partly on the differential pressure measurements, the sample length, the sample velocity, the contact angle, a sample channel height of the sample channel, and a sample channel width of the sample channel comprises: computing a capillary pressure difference pc across the upstream air-liquid interface according to:

$$\Delta P_{capillary} = \frac{2\sigma\cos\theta}{\bar{R}} \quad (2)$$

where $\sigma$ is a predetermined surface tension of the liquid sample, and $\bar{R}$ is a hydraulic radius of the sample channel according to:

$$\bar{R} = \frac{1}{\frac{1}{H} + \frac{1}{W}} \quad (3)$$

where H is the sample channel height of the sample channel and W is the sample channel width of the sample channel; computing a volumetric flow rate Q of the liquid sample according to:

$$Q = HW\bar{v} \quad (6)$$

where $\bar{v}$ is the sample velocity of the liquid sample in the sample channel; and computing the viscosity of the liquid sample as a ratio of the shear stress $\tau_w$ and shear rate $\dot{\gamma}$ at the sample channel wall according to:

$$\tau_w = \frac{H(\Delta P - \Delta P_{capillary})}{2\left(1 + \frac{H}{W}\right)L_{sample}} \quad (4)$$

$$\dot{\gamma} = \frac{6Q}{\left(1 + \frac{H}{W}\right)WH^2} \quad (5)$$

where $\Delta P$ is the differential pressure, and $L_{sample}$ is the sample length in the sample channel of the liquid sample.

Embodiment 45. The method of any one of Embodiments 40 to 44 using the viscometry system of any one of Embodiments 31 to 39.

The foregoing description has been presented for the purpose of illustration and is not intended to be exhaustive or to limit the invention to the precise form disclosed. While some embodiments have all of the elements described herein, other embodiments may have only some or part of the elements described herein. A person skilled in the art can faithfully reproduce any of the embodiments described herein.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

The indefinite articles "a" and "an," as used herein in the specification and in the claims, unless clearly indicated to the contrary, should be understood to mean "at least one". The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of", or when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either", "one of", "only one of", or "exactly one of". "Consisting essentially of", when used in the claims, shall have its ordinary meaning as used in the field of patent law.

The computing elements or functions disclosed herein may include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory. Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Naturally, in view of the teachings and disclosures herein, persons having ordinary skill in the art may appreciate that alternate designs and/or embodiments of the invention may be possible (e.g., with substitution of one or more components for others, with alternate configurations of components, etc). Although some of the components, relations, configurations, and/or steps according to the invention are not specifically referenced and/or depicted in association with one another, they may be used, and/or adapted for use, in association therewith. All of the aforementioned and various other structures, configurations, relationships, utilities, any which may be depicted and/or based hereon, and the like may be, but are not necessarily, incorporated into and/or achieved by the invention. Any one or more of the aforementioned and/or depicted structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention.

Other modifications and alterations may be used in the design, manufacture, and/or implementation of other embodiments according to the present invention without departing from the spirit and scope of the invention, which is limited only by the claims of this patent application and any divisional and/or continuation applications stemming from this patent application.

The invention claimed is:

1. A viscometry sample holder comprising:
   a sample channel configured to flow a liquid sample under pressure, the sample channel having an upstream end and a downstream end opposite the upstream end along a length of the sample channel;
   a viewing window providing optical access to the liquid sample in the sample channel; and
   a plurality of ports comprising:
      a loading port fluidly coupled to the sample channel proximal the upstream end of the sample channel for loading the liquid sample into the sample channel;
      a gas injection port fluidly coupled to the sample channel proximal the upstream end of the sample channel for injecting a gas into the sample channel;
      an exhaust port fluidly coupled to the sample channel proximal the downstream end of the sample channel;
      an upstream pressure port proximal the upstream end of the sample channel and coupled for measuring an upstream pressure in the sample channel adjacent the upstream pressure port; and
      a downstream pressure port proximal the downstream end of the sample channel and coupled for measuring a downstream pressure in the sample channel adjacent the downstream pressure port.

2. The viscometry sample holder of claim 1, wherein the downstream pressure port is between the upstream pressure port and the exhaust port along the length of the sample channel.

3. The viscometry sample holder of claim 1, wherein the gas injection port is fluidly coupled to the sample channel at the upstream end of the sample channel.

4. The viscometry sample holder of claim 1, wherein the gas injection port is the upstream pressure port.

5. The viscometry sample holder of claim 1, wherein the gas injection port is different from the upstream pressure port, and the upstream pressure port is between the gas injection port and the downstream pressure port along the length of the sample channel.

6. The viscometry sample holder of claim 1, wherein the sample channel has a sample channel height of 75 nm to 200 µm.

7. The viscometry sample holder of claim 1, wherein the sample channel has a sample channel width of 500 nm to 1500 µm.

8. The viscometry sample holder of claim 1, comprising a sample chip, the sample chip comprising a plurality of sample chip layers comprising:
- a base layer;
- a cover layer; and
- a sample channel layer sandwiched between an upper surface of the base layer and an opposing lower surface of the cover layer, wherein:
- the sample channel layer comprises a sample channel slit opening traversing a thickness of the sample channel layer, wherein the sample channel slit opening is defined by a sample channel wall;
- the viewing window comprises at least a part of the cover layer adjacent the sample channel; and
- for each one of the plurality of ports, independently, at least one of the base layer or the cover layer comprises that one of the plurality of ports.

9. The viscometry sample holder of claim 8, wherein the upper surface of the base layer, the sample channel wall, and the lower surface of the cover layer together define the sample channel.

10. The viscometry sample holder of claim 8, wherein the plurality of sample chip layers further comprises:
- a loading channel layer comprising a loading channel fluidly coupled:
  - to the loading port at a loading port end of the loading channel; and
  - to the upstream end of the sample channel at a sample channel end of the loading channel,
- wherein an upper surface of the sample channel layer, the sample channel wall, and the lower surface of the cover layer together define the sample channel.

11. The viscometry sample holder of claim 8, wherein the cover layer comprises each one of the plurality of ports.

12. The viscometry sample holder of claim 8, wherein the plurality of sample chip layers comprises alignment structures configured for alignment of the plurality of sample chip layers.

13. The viscometry sample holder of claim 8, further comprising a sample chip case configured to enclose the sample chip, the sample chip case comprising a sample chip case base and a sample chip case cover, wherein:
- the sample chip case base and a sample chip case cover are respectively configured for assembly to define an interior space sized and shaped to fittingly enclose the sample chip;
- the sample chip case cover comprises a window opening sized, shaped, and positioned for alignment with the at least the part of the cover layer adjacent the sample channel, to provide the optical access to the liquid sample in the sample channel when the sample chip is enclosed in the sample chip case and the sample chip case is assembled, wherein the viewing window further comprises the window opening; and
- for each one of the plurality of ports, the sample chip case comprises a corresponding port coupler configured for fluid coupling with the corresponding port.

14. The viscometry sample holder of claim 13, wherein for each one of the plurality of the ports, the corresponding port coupler forms an airtight seal with the port when the sample chip is enclosed in the sample chip case and the sample chip case is assembled.

15. The viscometry sample holder of claim 13, wherein the sample chip case base comprises a perimeter ridge proximal a perimeter of the sample chip case base and extending from an upper surface of the sample chip case base opposing a lower surface of the sample chip case cover when the sample chip case is assembled, the sample chip case cover comprises a perimeter groove proximal a perimeter of the sample chip case cover and extending into the lower surface of the sample chip case cover, wherein the perimeter ridge and the perimeter groove are respectively sized, shaped, and configured for nesting of the perimeter ridge in the perimeter groove when the sample chip case is assembled for alignment of the sample chip case cover and the sample chip case base.

16. The viscometry sample holder of claim 13, wherein the sample chip case base comprises one or more prying grooves formed in the upper surface of the sample chip case base for prying apart the assembled sample chip case cover and the sample chip case base.

17. A viscometry system comprising:
- the viscometry sample holder of claim 1;
- a gas pump fluidly coupled to the gas injection port and operable to inject the gas into the sample channel to flow the liquid sample under pressure in the sample channel;
- a pressure gauge coupled to the upstream pressure port and the downstream pressure port and operable to measure a differential pressure based on the upstream pressure and the downstream pressure;
- an optical imager operable and positioned to optically image the liquid sample in the sample channel through the viewing window; and
- a controller:
  - coupled to the pressure gauge to receive differential pressure measurement signals from the pressure gauge;
  - coupled to the optical imager to receive optical sample image signals from the optical imager; and
  - operable to compute a viscosity of the liquid sample in the sample channel based on the differential pressure measurement signals and the optical sample image signals.

18. The viscometry system of claim 17, wherein the optical imager comprises a camera operable to generate a video signal of the liquid sample while flowing in the sample channel, wherein the optical sample image signals comprise the video signal.

19. The viscometry system of claim 17, wherein the optical imager comprises a camera operable to capture a sequence of images of the liquid sample while flowing in the sample channel, wherein the optical sample image signals comprise the sequence of images.

20. The viscometry system of claim 17, wherein the controller is operable:

to determine an average sample velocity of the liquid sample while flowing in the sample channel based on the optical sample image signals; and to compute the viscosity of the sample in the channel based on the differential pressure measurement signals and the determined average sample velocity of the liquid sample while flowing in the sample.

21. The viscometry system of claim 20, wherein the controller is operable:

to determine a length of the liquid sample while flowing in the sample channel based on the optical sample image signals; and to compute the viscosity of the sample in the channel based on the differential pressure measurement signals, the determined average sample velocity of the liquid sample while flowing in the sample channel, and the length of the liquid sample while flowing in the sample channel.

22. The viscometry system of claim 21, wherein the controller is operable:

to compute a shear stress of the liquid sample while flowing in the sample channel based on the differential pressure measurement signals, the length of the liquid sample while flowing in the sample channel, and cross-sectional dimensions of the sample channel;

to compute a shear rate of the liquid sample while flowing in the sample channel based on the determined average sample velocity of the liquid sample while flowing in the sample channel, and the cross-sectional dimensions of the sample channel; and to compute the viscosity of the sample in the channel based on the computer shear stress and the computed shear rate.

23. The viscometry system of claim 22, wherein:

the optical imager is operable to optically image an upstream air-liquid interface of the liquid sample; and the controller is operable:

to determine a dynamic contact angle of the upstream air-liquid interface with a sidewall of the sample channel based on the optical sample image signals; and to compute the viscosity of the sample in the channel based at least in part on the dynamic contact angle.

24. The viscometry system of claim 23, wherein the controller is operable:

to compute a capillary pressure difference based on the determined dynamic contact angle of the upstream air-liquid interface, a surface tension of the liquid sample, and a hydraulic radius of the sample channel; and to compute the shear stress based in part on the computed capillary pressure difference.

25. The viscometry system of claim 24, wherein the controller is operable to compute the viscosity as the ratio of the shear stress $\tau_w$ and shear rate $\dot{\gamma}$ at the sample channel wall according to:

$$\tau_w = \frac{H(\Delta P - \Delta P_{capillary})}{2\left(1 + \frac{H}{W}\right)L_{sample}}$$

$$\dot{\gamma} = \frac{6Q}{\left(1 + \frac{H}{W}\right)WH^2}$$

where H is a sample channel height of the sample channel, W is a sample channel width of the sample channel, $\Delta P$ is the differential pressure measured by the pressure gauge, $L_{sample}$ is the length in the sample channel of the liquid sample, the volumetric flow rate Q of the liquid sample is:

$$Q = HW\bar{v}$$

where $\bar{v}$ is the average sample velocity v of the liquid sample flow in the sample channel, and $\Delta P_{capillary}$ is the capillary pressure difference according to:

$$\Delta P_{capillary} = \frac{2\sigma\cos\theta}{\bar{R}}$$

where σ is the surface tension of the liquid sample, σ is the dynamic control contact angle, and $\bar{R}$ is the hydraulic radius of the sample channel determine by:

$$\bar{R} = \frac{1}{\frac{1}{H} + \frac{1}{W}}.$$

* * * * *